J. V. CARTER.
PNEUMATIC STRAW STACKER.
APPLICATION FILED FEB. 15, 1918.
1,286,939.
Patented Dec. 10, 1918.
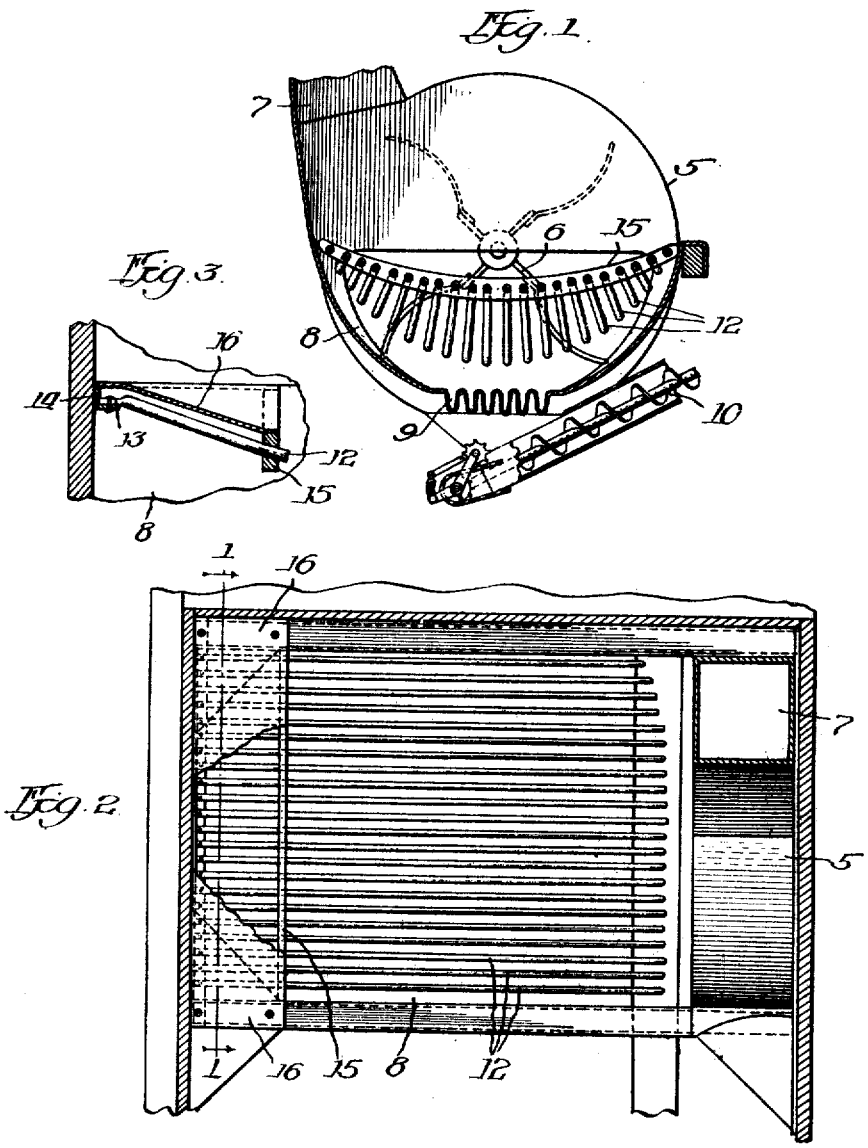
Inventor
John V. Carter
By James A. Walsh,
Atty

UNITED STATES PATENT OFFICE.

JOHN V. CARTER, OF INDIANAPOLIS, INDIANA, ASSIGNOR TO THE INDIANA MANUFACTURING COMPANY, OF INDIANAPOLIS, INDIANA, A CORPORATION OF WEST VIRGINIA.

PNEUMATIC STRAW-STACKER.

1,286,939.  Specification of Letters Patent.  Patented Dec. 10, 1918.

Application filed February 15, 1918. Serial No. 217,368.

*To all whom it may concern:*

Be it known that I, JOHN V. CARTER, a citizen of the United States, residing at Indianapolis, in the county of Marion and State of Indiana, have invented certain new and useful Improvements in Pneumatic Straw-Stackers, of which the following is a specification.

My invention relates to improvements in pneumatic straw stackers for threshing machines, and is designed to impart additional separation to the material which is discharged from the rear end of the thresher. As is well known, threshing machines are unable to separate and save all the grain under certain conditions, such as faulty adjustments of its separating mechanisms, unfavorable grain conditions, over-feeding, carelessness in operating, and other causes, and, when straw and other material is discharged from its rear end into a stacker, the unthreshed heads and loose grains mingled therewith are carried from the machine into the straw stack and become wasted. My present improvement is especially applicable to the grain saving wind stacker, the object being to cause further separation of the material discharging from the thresher, so that the grain separated therefrom may be trapped and returned to the machine to be recleaned and saved, as will be hereinafter more fully explained.

In the accompanying drawing, forming a part hereof, Figure 1 is an elevation, partly in section, of a stacker fan and associated parts commonly employed in a grain saving wind stacker, showing my improved separating fingers as seen when looking in the direction indicated by the arrows 1—1 in Fig. 2; Fig. 2, a plan of a stacker hopper with my improvement applied thereto; Fig. 3, a detail sectional view showing the manner of attaching and supporting the fingers, and Fig. 4 is an elevation of the bridge or supporting member through which the fingers are projected and supported.

In said drawing, the portions marked 5 indicate the stacker fan drum, 6, the fan therein, 7, the outlet or boot through which material is ejected, 8, the material receiving and conveying hopper, 9, the grain trap, and 10, an auger for returning trapped grain to the threshing machine to be recleaned and saved, all of which parts are common and well known, and will not, therefore, be specifically described herein.

At the side of hopper 8, opposite to that of the fan, I secure a set of fingers, 12, in any suitable manner, preferably by flattening the ends, 13, thereof and riveting them to an angle bar, 14, or other suitable support associated with the stacker. These fingers are run through a supporting member or bridge, 15, (Fig. 4) and across the hopper 8, terminating adjacent the fan 6, as indicated in Fig. 2. Said bridge 15 is so shaped preferably as to conform to the contour of the hopper, that shown being of a concavo-convex formation. By projecting said fingers through the bridge they are maintained above and from contact with the hopper. They are of a resilient character, and, being secured by the bridge in curved formation, follow the contour of the hopper, so that in effect the series of rods or fingers lie in concave formation over the hopper.

In operation, the straw, chaff, etc., discharging from the threshing machine into the wind stacker, falls upon said fingers 12, and this constantly falling mass is subjected to separation, not only by partially sifting through the fingers, but the resilient or spring force thereof causes a rebounding and disrupting of the mass, so that the material is kept in a tumbled and agitated condition, permitting the heavy grains and unthreshed heads of grain, with finer straw particles, to pass between the fingers to the hopper bottom, and travel to the grain trap 9, where such finer material and grain is trapped, and passes through said trap to the auger 10, to be conveyed thereby to the thresher, while the heavier straw mass rides along the fingers by gravity and the suction influence of the fan 6 and is withdrawn into the drum 5 and ejected through outlet pipe 7, to be deposited in a pile or stack as usual. In providing bridge 15 in the manner described, it is desirable to cover the space therebetween and the outer wall of the stacker chamber so that material falling at that side of the stacker, which is away from the suction influence of the fan 6, may by gravity be caused to pass over that portion of the finger structure and not become clogged, and, therefore, I provide the cover or deflecting plate, 16, shown in broken lines in Fig. 2, which may be made of sheet metal or other material designed and arranged in any suitable manner, and which prevents material from lodging between said fingers at that point.

I have found my improved separating fingers especially advantageous in handling corn fodder in corn husking and shredding machines, as well as wheat, oats and other straws in threshing machines, as the fodder and straw masses become disrupted and disturbed when striking the resilient fingers, permitting shelled corn and grain kernels to become separated from the mass and pass between the fingers to be captured by the grain trap 9, a material portion of which corn and kernels would otherwise go into the stacker fan and be discharged in the fodder or straw pile, but by my improvement, their passage toward the stacker fan becomes retarded sufficiently to permit the suction influence of the fan to draw them toward the trap and be deposited therein to be saved.

I claim as my invention:

1. In a pneumatic stacker, comprising a fan housing, a fan therein, a material receiving and conveying hopper communicating with said fan, and a separating device in said hopper comprising a series of fingers arranged transversely of and above said hopper and terminating adjacent said fan.

2. In a pneumatic stacker comprising a fan housing, a fan therein, a material receiving and conveying hopper communicating with said fan, a grain trap in said hopper, and a separating device in said hopper comprising a series of resilient fingers arranged transversely of said hopper and terminating adjacent said fan.

3. In a pneumatic stacker, a hopper, a supporting member in said hopper, and a separating device in said hopper comprising a series of resilient fingers secured at one side thereof and projecting through said supporting member in a manner to conform to the contour of said hopper.

4. In a pneumatic stacker, a hopper, a supporting member in said hopper, a separating device in said hopper comprising a series of fingers secured at one side thereof and projecting through said supporting member, and means adjacent said supporting member for covering said fingers to prevent clogging of material therebetween.

5. In a pneumatic stacker, a hopper for receiving and conveying material from a separating machine, a series of fingers secured at one side of said hopper and extending across same for separating material, and a cover over a portion of said fingers for deflecting and preventing material from lodging therebetween.

6. In a pneumatic stacker, a hopper for receiving and conveying material from a separating machine, a bridge in said hopper conforming to the contour thereof, and a series of separating fingers supported by said bridge.

7. In a pneumatic stacker, a hopper for receiving and conveying material from a separating machine, a series of fingers extending across said hopper, and a bridge for supporting the free ends of said fingers above said hopper to permit vibration thereof through contact with material discharging thereon.

In testimony whereof I affix my signature in the presence of two witnesses.

JOHN V. CARTER.

Witnesses:
J. K. SHARPE,
LEE R. GARBER.

Copies of this patent may be obtained for five cents each, by addressing the "Commissioner of Patents, Washington, D. C."